United States Patent
Shima

[11] Patent Number: 6,148,164
[45] Date of Patent: Nov. 14, 2000

[54] PRINTER HAVING A DOUBLE-SIDED PRINT FUNCTION AND DOUBLE-SIDED PRINT CONTROLLER

[75] Inventor: Toshihiro Shima, Nagano, Japan

[73] Assignee: Seiko Epson Corporation, Tokyo, Japan

[21] Appl. No.: 09/416,944

[22] Filed: Oct. 13, 1999

[30] Foreign Application Priority Data

Oct. 14, 1998 [JP] Japan ................................. 10-292387
Aug. 24, 1999 [JP] Japan ................................. 11-236686

[51] Int. Cl.[7] ................................................ G03G 15/00
[52] U.S. Cl. ............................................. 399/82; 395/111
[58] Field of Search .................................. 399/82, 83, 84, 399/85, 75; 358/1.1, 1.15, 1.16, 1.17; 395/111, 115, 116

[56] References Cited

U.S. PATENT DOCUMENTS 5,872,900  2/1999  Tsuchitoi .................................. 395/111

FOREIGN PATENT DOCUMENTS

| 1-29111 | 6/1989 | Japan | ................................. H04N 1/21 |
| 2522799 | 5/1996 | Japan | ................................. G03G 21/14 |
| 8-223351 | 8/1996 | Japan | ................................. H04N 1/00 |
| 9-174956 | 7/1997 | Japan | ................................. B41J 5/30 |

Primary Examiner—Arthur T. Grimley
Assistant Examiner—Hoan Tran
Attorney, Agent, or Firm—Sughrue, Mion, Zinn, Macpeak & Seas, PLLC

[57] ABSTRACT

Print requests in page units are prepared from print job data received from a host and the print request order is managed in a request order queue. Whenever an attempt is made to start the next page print, a print page determination section counts the number of print requests n listed so far in the queue and print ordinal number m indicating the print order of the next page print, counted from the first page print and uses one predetermined function f (m, n) to determine the next page to be printed.

20 Claims, 13 Drawing Sheets

FIG. 8

| STAGE | PRINT REQUEST WHICH COMES | PRINT PAGE DETERMINATION | PAGE PROCESSING | PRINT ORDINAL NUMBER (m) |
|---|---|---|---|---|
| 1 | NONE | | | 0 |
| 2 | FACE REAR<br>[1]─[2]<br>1   1 | CONTINUOUS PRINT | | |
| 3 | | m = 1, n = 2<br>↓<br>[2] IS SELECTED | | |
| 4 | [1]─[2]<br>1   0 | | PRINT START OF [2] | 1 |
| 5 | [1]─[2]─[3]─[4]<br>1   0   1   1 | | | |
| 6 | | m = 2, n = 4<br>↓<br>[4] IS SELECTED | | 2 |
| 7 | [1]─[2]─[3]─[4]<br>1   0   1   0 | | PRINT START OF [4] | |
| 8 | | m = 3, n = 4<br>↓<br>[1] IS SELECTED | | 3 |
| 9 | [1]─[2]─[3]─[4]<br>0   0   1   0 | | PRINT START OF [1] | |

FIG. 9

| STAGE | PRINT REQUEST WHICH COMES | PRINT PAGE DETERMINATION | PAGE PROCESSING | PRINT ORDINAL NUMBER (m) |
|---|---|---|---|---|
| 10 | 1-2-3-4-5-6<br>0  0  1  0  1  1 | | | 4 |
| 11 | | m = 4, n = 6<br>↓<br>6 IS SELECTED | | |
| 12 | 1-2-3-4-5-6<br>0  0  1  0  1  0 | | PRINT START OF 6 | |
| 13 | | m = 5, n = 6<br>↓<br>3 IS SELECTED | | 5 |
| 14 | 1-2-3-4-5-6<br>0  0  0  0  1  0 | | PRINT START OF 3 | |

FIG. 10

| STAGE | PRINT REQUEST WHICH COMES | PRINT PAGE DETERMINATION | PAGE PROCESSING | PRINT ORDINAL NUMBER (m) |
|---|---|---|---|---|
| 10 | 1─2─3─4─5─6<br>0  0  1  0  1  1 | | | 4 |
| 11 | | NO PAPER<br>↓<br>(STOP PRINT) | | |
| 12 | 1─2─3─4─5─6<br>0  0  1  0  1  1 | 5 AND 6<br>ARE EXCLUDED<br>↓<br>m = 4, n = 4<br>↓<br>3 IS SELECTED | | |
| 13 | | | PRINT START<br>OF 3 | |
| 14 | →1─2─3─4─5─6<br>0  0  0  0  1  1 | NO REQUEST | | |

PRINTER HAVING A DOUBLE-SIDED PRINT FUNCTION AND DOUBLE-SIDED PRINT CONTROLLER

BACKGROUND OF THE INVENTION

1. Field of the Invention

This invention relates to a printer having a double-sided print function.

The present application is based on Japanese Patent Applications No. Hei. 10-292387 and 11-236686, which are incorporated herein by reference.

2. Description of the Related Art

A laser-beam printer particularly among printers is often used for printing text documents in an office, etc., and thus is designed to be able to print in different modes of not only simple single-sided print, but also double-sided print, multiple-copy print, etc. Methods for speeding up print are also devised actively. Further, various steps to be taken for an error occurring in printing are also developed.

One of related arts for executing double-sided print at high speed is invention of a double-sided image formation apparatus described in Japanese Patent Publication No. Hei. 1-29111. This related art specifically relates to a copy machine for copying an image read from an original bed rather than a printer for receiving print data from a host and interpreting and printing the print data. To make a double-sided copy of a document consisting of a number of pages, one ingenious sequence fitted to high-speed print is adopted for a print sequence as to images on which pages are printed on the face and back of paper in what order. In the print sequence, print is executed in a specific order different from the page order. To enable images on correct pages to be printed on the face and back of paper even in the print order different from the page order, two image memories each for one page corresponding to the face and back of paper are provided and page image read from the face image memory or that from the back image memory is selected in response to a signal related to the transport state transition of paper.

Another relevant related art is Japanese Patent No. 2522799. It discloses steps to be taken if print paper runs out while double-sided print is being executed. That is, if it becomes impossible to supply a new sheet of paper from a paper feed tray while double-sided print is being executed using the same print sequence as in Japanese Patent Publication No. Hei. 1-29111 described above, immediately the print page order following the print sequence is changed so that the sheet of paper whose face is already printed does not remain in the printer for hours, then the sheet of paper whose face is already printed remaining in the printer is fed taking precedence over any other paper, print on the back of the remaining sheet of paper is completed, and the sheet is discharged.

The two related arts described above are control arts specialized only for the print mode in which double-sided print is executed and moreover the number of print copies is one. Since print mode variations are not so many if a copy machine for reading an image from an original bed and printing the image is involved, the design for providing a dedicated control program for realizing a print sequence specialized only for double-sided print of one copy and further providing control programs specialized for other print modes may be reasonable. The design for providing image memories for two pages for the face and back of paper as in Japanese Patent Publication No. Hei. 1-29111 may be sufficiently adoptable considering circumstances where the copy machine would be constant in image resolution and moreover large-capacity memory and a high-performance CPU are easily installed because the copy machine is a high-price product. The method as in Japanese Patent No. 2522799 wherein if a no-paper error occurs during execution of the print sequence specialized only for double-sided print of one copy, immediately the print sequence is stopped and is switched to another sequence for the no-paper error is also adoptable from the viewpoint of the machine capability if the machine has large-capacity memory capable of storing various print sequence control programs responsive to various situations (if enormous manpower required for development of the various control programs is ignored).

However, for the printer, it is becoming considerably difficult to realize the above-described related arts. One of the reasons is that the printer receives print job data from a host and interprets and prints the data and moreover the possible print modes requested by the host are diversified. That is, the printer cannot previously know what print mode is requested by the host, namely, single-sided or double-sided print and the number of print copies. The printer cannot know the print mode until it receives print job data from a host and interprets the data. Moreover, the printer can know only the received page and cannot know even the total number of subsequent pages unreceived. For example, the case is also possible where double-sided print and one as the number of print copies are applied to the first to fourth pages and double-sided print and two as the number of print copies are applied to the fifth page and later. The printer must be able to cover all print modes that can be assumed and moreover also able to cope flexibly with the print mode difference for each page as in the above-given example. Moreover, an appropriate print sequence must be determined in response to the situation on the spot within the range of the information that can be grasped from the current data already received.

Under such circumstances, first the print mode variations that can be assumed are numerous and thus it is practically impossible to develop print sequence control programs fitted to the print modes. Even if it is possible to develop the control programs, extremely large-capacity memory for storing the control programs is required and it is extremely difficult to provide the lower-price printer than the copy machine with the extremely large-capacity memory. Even if it is possible to provide the printer with the extremely large-capacity memory, it is extremely difficult for a CPU to generate image data at high speed and realize high-speed print while frequently selecting, changing, and executing a large number of types of control programs corresponding to various print modes in response to the interpretation result of reception data with the CPU capability allowed in the printer price range.

Since the print image resolution varies from one print job to another in the printer, the technique of providing image memories for two pages for the face and back of paper as in Japanese Patent Publication No. Hei. 1-29111 cannot be adopted at all.

The technique of switching to the print order in another print sequence if an error occurs during execution of a predetermined print sequence in a printer order as in Japanese Patent No. 2522799 cannot be adopted either for the printer hard to provide all print sequences that can be assumed as described above.

SUMMARY OF THE INVENTION

It is therefore an object of the invention to provide a printer that can flexibly cover various print modes and moreover has a double-sided print function with a high-speed print capability.

It is another object of the invention to provide very flexible print order determination means not depending on a predetermined print sequence, namely, a fixed print order like the conventional means and drastically different from the conventional means.

It is still another object of the invention to provide a print order determination technique, drastically different from the conventional technique, for determining the print order dynamically and flexibly and according to a unified rule from the print job data received so far.

It is still another object of the invention to provide a print order determination technique capable of always determining the optimum print order flexibly in response to change if the used paper size or the paper transport direction is changed.

According to a first aspect of the invention, there is provided a printer comprising a print engine that can print a page image on both sides of paper and a controller for controlling the print engine. The controller comprises:

(1) a print request preparation section for preparing a print request in page units from received print job data; a queue comprising the prepared print requests listed in one order;

(2) a print page determination section for counting the number of print requests included in print objects among the print requests in a double-sided print mode existing in the queue, counting the print ordinal number of the next page print (namely, page print order counted from the first page print), and applying a unified rule to the counted number of print requests and the counted print ordinal number each time an attempt is made to start the next page print, thereby determining the print request corresponding to the next page print from among the print requests included in the print objects; and (3) a page processing section for controlling the print engine so as to execute the print request determined by the print page determination section.

According to the double-sided printer, whenever an attempt is made to execute the next page print, the print request corresponding to the next page print (namely, which page is to be next printed) is determined based on the number of print requests and the print ordinal number of the next page print prepared from the print job data received so far. As reception of print job data and print of the print engine advance, the number of print requests and the print ordinal number of the next page print vary from moment to moment. The page number of the next page to be printed changes in response to the variation. Therefore, the printer does not have a predetermined print sequence. Further, the rule for determining the next print page is a unified rule. The printer order is determined simply in accordance with the unified rule regardless of how many the number of copies (the number of print copies) is or whether or not paper exists on the input tray. Resultantly, the printer can flexibly cover various print modes and the required program is not enormous.

Preferably, the unified rule is a function with the number of print requests stored in the queue and the print ordinal number of the next page print as variables.

Preferably, for the print requests in the double-sided print mode existing in the queue, the same unified rule is applied for determining the print request corresponding to the next page print regardless of whether or not the print requests belong to the same or different print job.

Preferably, if print requests in the double-sided print mode and the single-sided print mode are mixed in the queue, the print requests in the double-sided print mode are classified into groups of continuously listed print requests in the queue and the unified rule is applied to each group for determining the print request of the next page to be printed.

Preferably, if a print request in the double-sided print mode specifying the number of copies as two or more exists in the queue, when the unified rule is applied, it is assumed that the print request in the double-sided print mode specifying the number of copies as two or more occurs in the queue as many times as the number of copies.

According to a second aspect of the invention, there is provided a printer comprising a print engine that can print a page image on both sides of paper and a controller for controlling the print engine. The print engine has an image formation mechanism and a paper transport mechanism for feeding paper into the image formation mechanism. The paper transport mechanism can transport paper of predetermined different sizes or can transport paper in the short-side direction or long-side direction thereof. Since the length of paper in the transport direction thereof differs, the maximum number of sheets of paper entering the paper transport mechanism varies.

The controller comprises:

(1) a plurality of rules for determining a print order in a double-sided print mode, corresponding to a plurality of values that the maximum number of sheets of paper entering the paper transport mechanism can take;

(2) a print request preparation section for preparing a print request in page units from received print job data;

(3) a queue comprising the prepared print requests listed in one order;

(4) a print order determination section for selecting one rule fitted to a specific used paper length from among the plurality of rules and uses the selected rule to determine the print order for the print requests included in print objects among the print requests in the double-sided print mode existing in the queue; and (5) a page processing section for controlling the print engine so as to execute the print requests existing in the queue in the print order determined by the print order determination section.

According to the printer, even if the paper size or the paper transport direction changes, one rule fitted to the change can be selected and used to determine the print order in the double-sided print mode. If the paper size and the paper transport direction are determined, one rule for determining the print order is selected, and the printer order is determined simply in accordance with the selected rule regardless of how many the number of copies (the number of print copies) is or whether or not paper exists on the input tray. Resultantly, the printer can flexibly cover various print modes and the required program is not enormous.

The print order determination method according to the invention typically can be executed by a computer and a computer program for the purpose can be installed in or loaded into the computer through various media such as disk-type storage, semiconductor memory, and a communication network.

Features and advantages of the invention will be evident from the following detailed description of the preferred embodiments described in conjunction with the attached drawings.

BRIEF DESCRIPTION OF THE DRAWINGS

In the accompanying drawings:

FIG. 8 is a schematic representation to specifically show how print pages are determined;

FIG. 9 is a schematic representation to specifically show how print pages are determined;

FIG. 10 is a schematic representation to specifically show how print pages are determined;

DETAILED DESCRIPTION OF THE PREFERRED EMBODIMENTS

Figure 1:
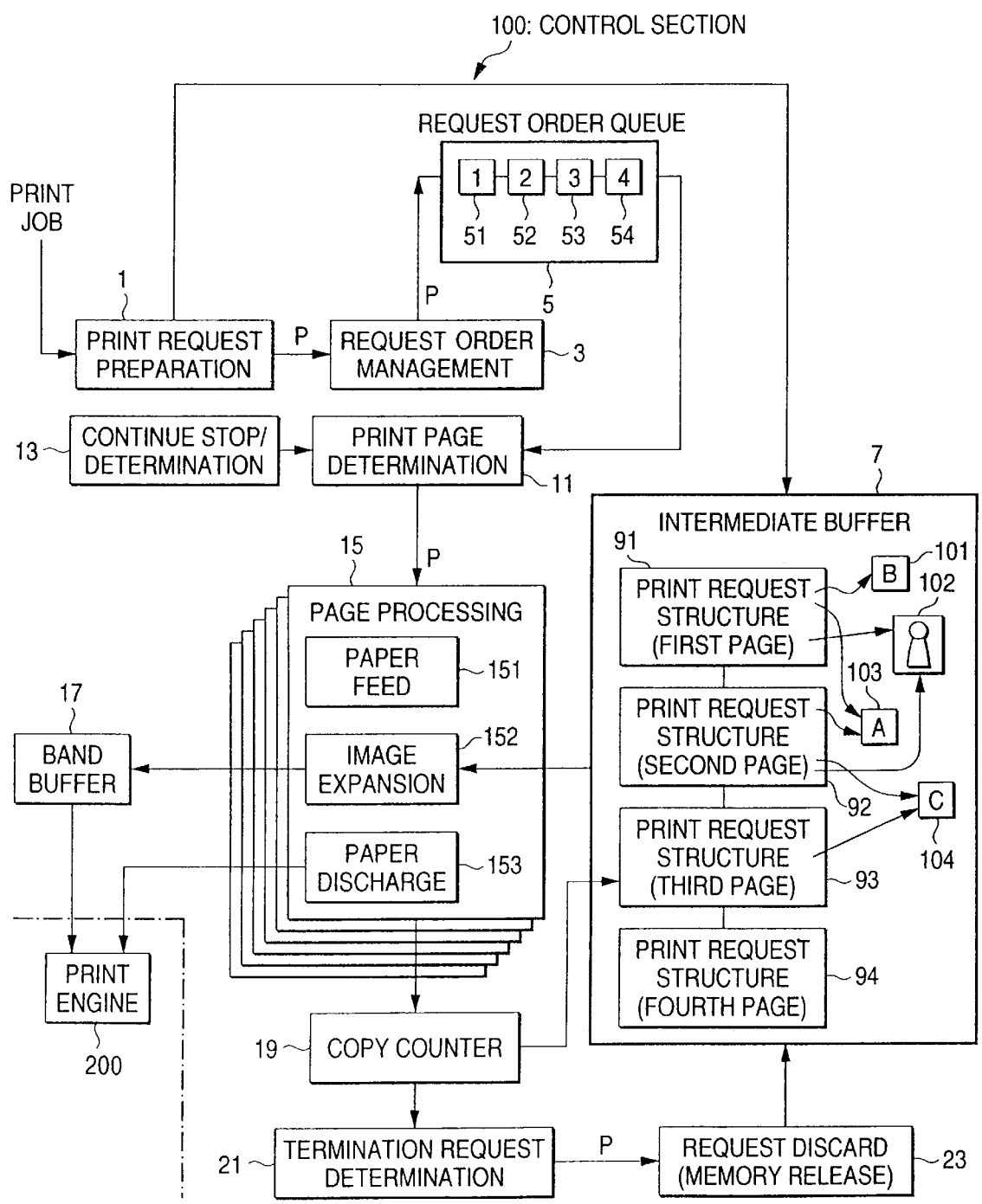
FIG. 1 is a block diagram to show one embodiment of the invention.

FIG. 1 shows the configuration of a printer according to one embodiment of the invention.

The printer comprises a control section 100 for controlling the print operation and a print engine 200 for printing an actual image on paper under the control of the control section 100. The control section 100 preferably is installed as a program of a microcomputer contained in the printer. However, at least a part of the control section 100 can also be installed as a dedicated hardware circuit of the printer. The control section 100 has process execution modules of a print request preparation section 1, a request order management section 3, a print page determination section 11, a continue/stop determination section 13, page processing sections 15, a copy counter 19, a termination request determination section 21, and a request discard section 23, and memory areas of a request order queue 5, an intermediate buffer 7, and a band buffer 17.

The print request preparation section 1 interprets print job data received from a host (not shown), prepares print request structures 91 to 94 in a one-to-one correspondence with pages and image data 101 to 104 of all print objects contained in the pages (text, graphics, photo, etc.,), and writes then into the intermediate buffer 7. The print request structures corresponding to the pages are linked with image data of all print objects contained in the pages. FIG. 1 shows how the print request structures 91 to 94 corresponding to the four pages of the first to fourth pages are stored in the intermediate buffer 7 as an example. For example, the print request structure 91 for the first page is linked with the image data 101, 102, and 103 of all print objects contained in the first page (character "A," a portrait, character "B"). The print request preparation section 1 also passes an address pointer P pointing to the memory address of each of the prepared print request structures 91 to 94 to the request order management section 3. Hereinafter, "print request structures" will be referred to simply as "print requests."

The request order management section 3 enters the pointer P received from the print request preparation section 1 in the request order queue 5. FIG. 1 shows how pointers 51 to 54 to the print requests 91 to 94 for the four pages are stored in the request order queue 5 as an example.

The print page determination section 11 accesses the request order queue 5, thereby keeping track of the number of print requests arriving up to now, n, for double-sided print and print ordinal number m indicating the order of the next page print to be executed, counted from the first page print. Then, the print page determination section 11 applies a unified function described later to the number of print requests, n, and the print ordinal number m, thereby determining which page (which request) is to be next printed. The print page determination section 11 passes the address pointer P to the determined print request to be next executed to the page processing section 15. A print request for double-sided print and a print request for single-sided print may come alternately, in which case the print requests for double-sided print coming consecutively are put into one group and the above-described processing is performed for each group and for the print requests for single-sided print, the next print page is determined in the order as the print requests come. For example, assume that first double-sided print requests of six pages come, next single-sided print requests of several pages come, next double-sided print requests of eight pages come. In this case, for the first print requests of six pages, the print order is determined while the number of requests, n, is counted according to the above-described procedure. Then, when a single-sided print request comes, incrementing the number of requests, n, is stopped and for the single-sided print requests of several pages, the order as they come is determined to be the print order. Then, when the double-sided print requests of eight pages come, again the number of requests, n, is counted from the beginning and the print order is determined according to the above-described procedure.

The continue/stop determination section 13 determines the mode of the print page determination section 11. The mode is either "continuous print" for continuously printing all pages corresponding to the current existing print requests 91 to 94 or "stop print" for excluding print requests not yet involved in actual print among the current existing print requests 91 to 94 from the print objects and printing only pages corresponding to the print requests already involved in actual print, then stopping print. Normally, "continuous print" is selected; when paper runs out from an input tray for paper feed, the mode is changed to "stop print."

The print page determination section 11 uses a unified function f (m, n) to determine the next print page regardless of "continuous print" or "stop print" as described later in detail. The difference between "continuous print" and "stop print" is only the difference in how to count the number of requests, n, described above (namely, in "stop print," the excluded print request is not counted as the number of requests, n). The technique of flexibly determining the print order from the print ordinal number m and the number of requests, n, at different times in a simple method following a unified rule (function) differs radically from the technique of advancing print using a predetermined print sequence, namely, a fixed print order as in the above-described related art, and is excellent in flexibility of compatibility with various print modes, light processing, and high-speed processing as compared with the related art.

The page processing sections 15 are provided in a one-to-one correspondence with pages. The page processing sections for a number of pages (in the example shown in the figure, six pages) exist and can operate concurrently. Each page processing section 15 reads the print request pointed to by the address pointer received from the print page determination section 11 and performs control for causing the print engine 200 to print the page corresponding to the print request. Each page processing section 15 has a paper feed section 151, an image expansion section 152, and a paper discharge section 153. The paper feed section 151 and the paper discharge section 153 control the paper feed operation and paper discharge operation of a paper transport mechanism of the print engine 200. The image expansion section 152 uses the image data 101 to 104 linked with given print requests to expand print images in the band buffer 17 and transfers the images to the print engine 200.

The band buffer 17 has a capacity to such an extent that at most several bands of image (normally, one page is divided into about several ten bands) can be expanded. This saves memory drastically as compared with the technique requiring image memories for two pages as in Japanese Patent Publication No. Hei. 1-29111. On the other hand, since the band buffer 17 is small, the page processing section 15 needs to expand a band image required at the present by the print engine 200 at high speed so as to catch up with the speed of the print engine 200. In the purpose of not delaying the image expansion, the point that the print page determination section 11 always determines the print order by one simple method regardless of various print modes is significant because much time is not consumed for processing of the print page determination section 11 and it becomes easy to assign the CPU to the page processing section accordingly.

The page processing section 15 checks whether or not the print engine 200 normally terminates print of the corresponding page. If print of the page is terminated normally, the page processing section 15 informs the copy counter 19 of the normal termination.

When the copy counter 19 is informed of the page print termination by the page processing section 15, it decrements the number of print copies (number of copies) written in the print request of the page by one (alternatively, apart from the number of copies written in the print request, a copy count with the same value as the number of copies as the initial value is provided in the memory for each print request, and the copy count is decremented by one). If the number of copies or the copy count decremented by the copy counter 19 reaches zero, it means that the page need not be printed any more.

The termination request determination section 21 checks whether or not print of a necessary number of copies for each page is complete, determines the print request corresponding to the complete print job, and sends the address pointer to the print request to the request discard section 23.

The request discard section 23 discards the print request corresponding to the complete print job from the intermediate buffer 7, namely, releases the print request area of the intermediate buffer 7.

The described components particularly related to the invention will be discussed in more detail.

Figure 2:
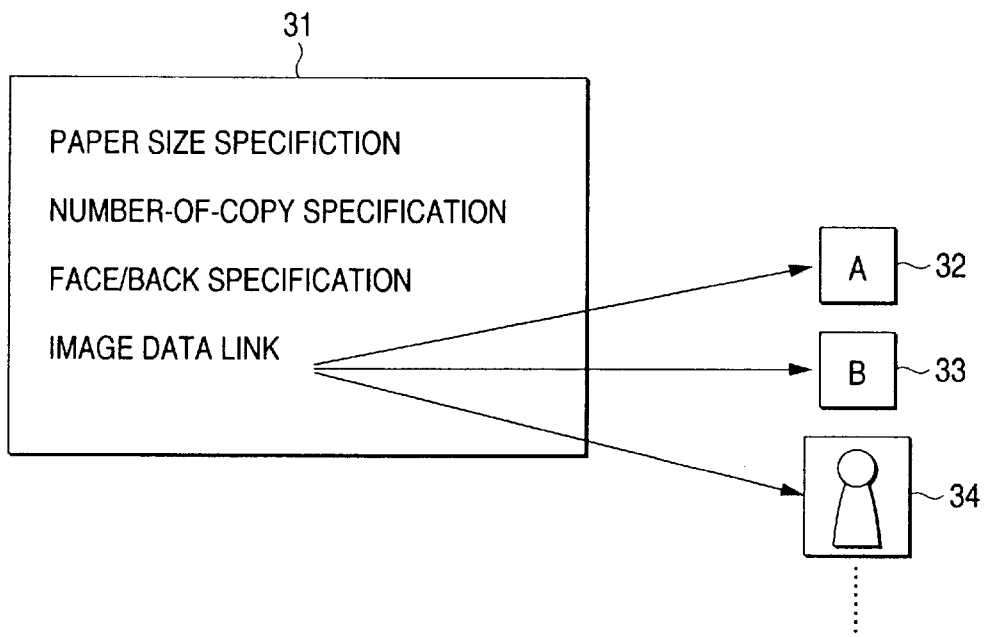
FIG. 2 is a schematic representation of a print request.

FIG. 2 shows main information contained in a print request of each page.

As shown in the figure, a one-page print request 31 contains paper size specification, specification of the number of copies (number of print copies), specification as to whether the print place is the face or rear of paper, and links to image data 32, 33, 34, . . . of all objects contained in the page. Therefore, by reading the print request 31, all paper and image information required for printing the page can be provided.

Figure 3:
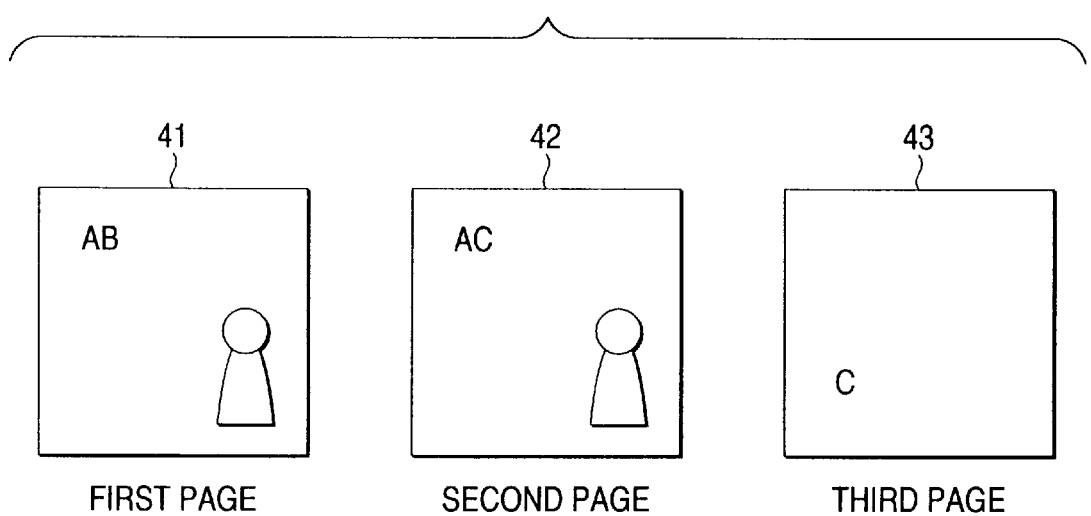
FIG. 3 is a drawing to show examples of images of pages corresponding to print requests 91 to 93 shown in FIG. 1.

FIG. 3 shows an example of page images corresponding to the print requests 91 to 93 in the intermediate buffer 7 illustrated in FIG. 1.

Image 41 on the first page shown in FIG. 3 consists of characters "A" and "B" and a portrait of a human being. Thus, as shown in FIG. 1, the image data 103 comprising the character "A" converted into a bit image so that the character "A" can be printed, the image data 101 comprising the character "B" converted into a bit image, and the image data 102 comprising the portrait converted into a bit image are linked to the print request 91 of the first page. For other pages, as seen by making a comparison between FIGS. 3 and 1, the image data of the bit image of the object used with the pages is linked to the print requests of the pages. The point to be noted here is that if the same object is used with two or more pages, only one image data piece of the object exists and is linked to the print requests of the two or more pages. Therefore, the image data is not provided separately for each page and basically only one image data piece exists for one object, so that the necessary memory capacity is minimized.

Next, the page processing section 15 will be discussed.

Figure 4:
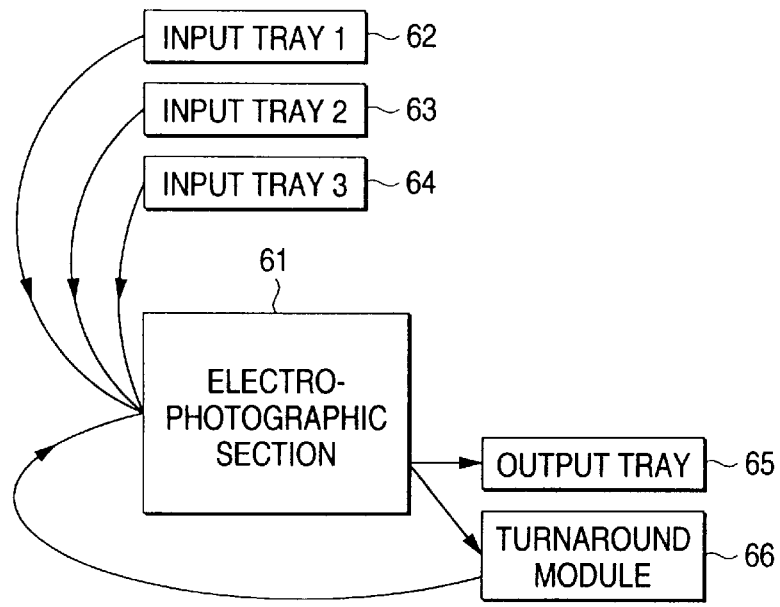
FIG. 4 is a block diagram of a print engine 200.

First, the configuration of the print engine 200 on which the page processing section 15 is based is shown in FIG. 4.

As shown in the figure, the print engine 200 has an electrophotographic unit 61 for printing an image on paper by an electrophotographic method, a plurality of input trays 62 to 64 for supplying new paper, one or more output trays 65 for discharging paper where print is complete, and a turnaround module 66 for turning around paper with one side already printed in the double-sided print mode. The input trays 62 to 64 allow paper of a different size to be placed for each tray or paper of the same size to be placed.

The page processing sections 15 are executed in a one-to-one correspondence with the pages, as described above. When the page processing section 15 is started, first, one is selected from among the input trays 62 to 64 and the turnaround module 66 as a paper source, and either the turnaround module 66 or the output tray 65 is selected as a discharge destination. One sheet of paper is fed into the electrophotographic unit 61 from the selected paper source and the electrophotographic unit 61 executes print and outputs the sheet of paper to the selected discharge destination.

Figure 5:
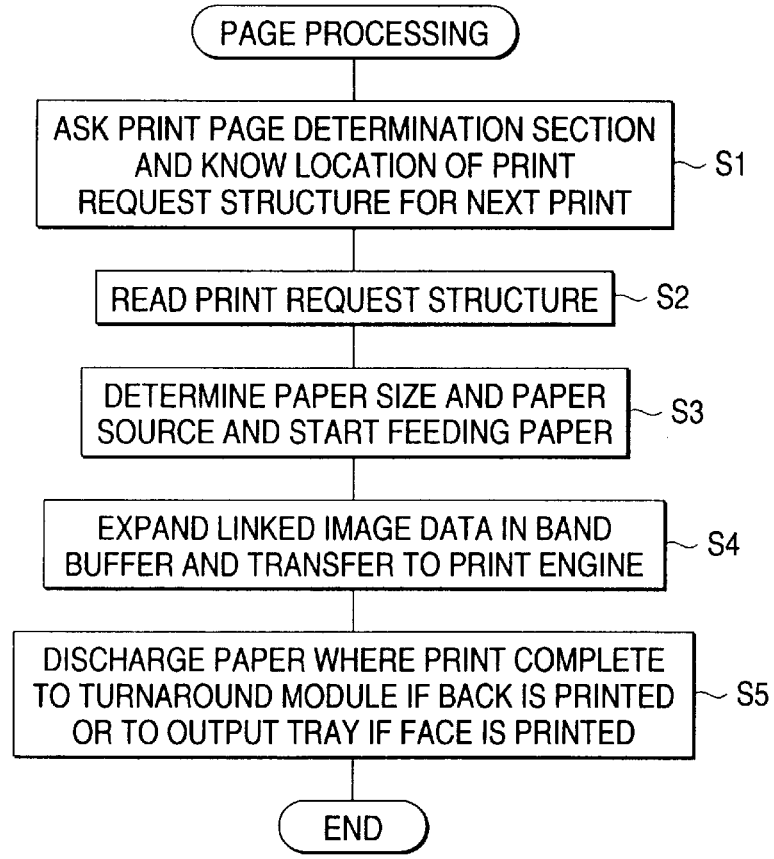
FIG. 5 is a flowchart of a page processing section 15.

FIG. 5 shows a flow of the page processing section 15.

First, the page processing section 15 gets the address pointer to the print request of the next page to be printed from the print page determination section 11 at step S1 and reads the print request pointed to by the pointer from the intermediate buffer 7 at step S2. Next, the page processing section 15 determines the paper size and the paper source from the paper size specification and the face/back specification written in the print request and causes the print engine 200 to feed paper at step S3. For example, if back specification in the double-sided print mode is made, the page processing section 15 selects the tray having paper of the specified paper size from among the input trays 62 to 64; if face specification in the double-sided print mode is made, the page processing section 15 selects the turnaround module 66.

Next, the page processing section 15 expands the image data linked to the read print request in the band buffer 17 in order starting at the top band of the page and transfers it to the print engine 200 at step S4. Then, in the print engine 200, the electrophotographic unit 61 prints an image on the fed paper.

Next, the page processing section 15 discharges the paper where print is complete, output from the electrophotographic unit 61 to the turnaround module 66 if back specification is made or to the output tray 65 if face specification is made at step S5.

In the processing flow, the page processing section 15 has no concern in the page order of the page processed by itself. Simply the page processing section 15 uses the print request passed from the print page determination section 11, selects the paper source and the discharge destination, prepares a band image, and transfers the prepared band image to the print engine 200 through one band buffer 17. This process does not contain burdensome control of selecting read from the face image memory or read from the back image memory in response to the signal related to the transport state transition of paper as in the related art of Japanese Patent Publication. No. Hei. 1-29111. Therefore, processing of the page processing section 15 is simpler than processing in the related art and an image can be prepared at high speed more easily.

Next, the print page determination section 11 will be discussed.

Figure 6:
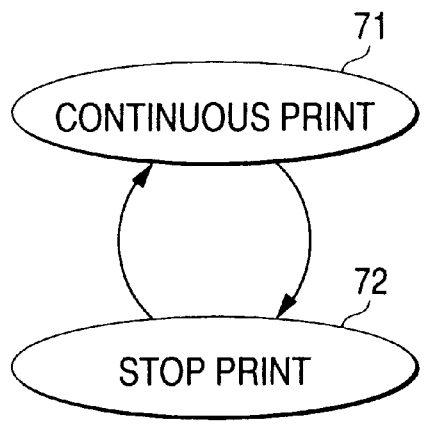
FIG. 6 is a mode transition diagram of a print page determination section 11.

As shown in FIG. 6, the mode of the print page determination section 11 is either "continuous print" 71 or "stop print" 72. As described above, the "continuous print" is a mode for continuously printing all pages corresponding to the current existing print requests. On the other hand, the "stop print" is a mode for excluding print requests not yet involved in actual print among the current existing print requests from the print objects and printing only pages corresponding to the print requests already involved in actual print, then stopping print. The normal mode is "continuous print;" when necessary paper runs out from the input tray, the mode is changed to "stop print."

Figure 7:
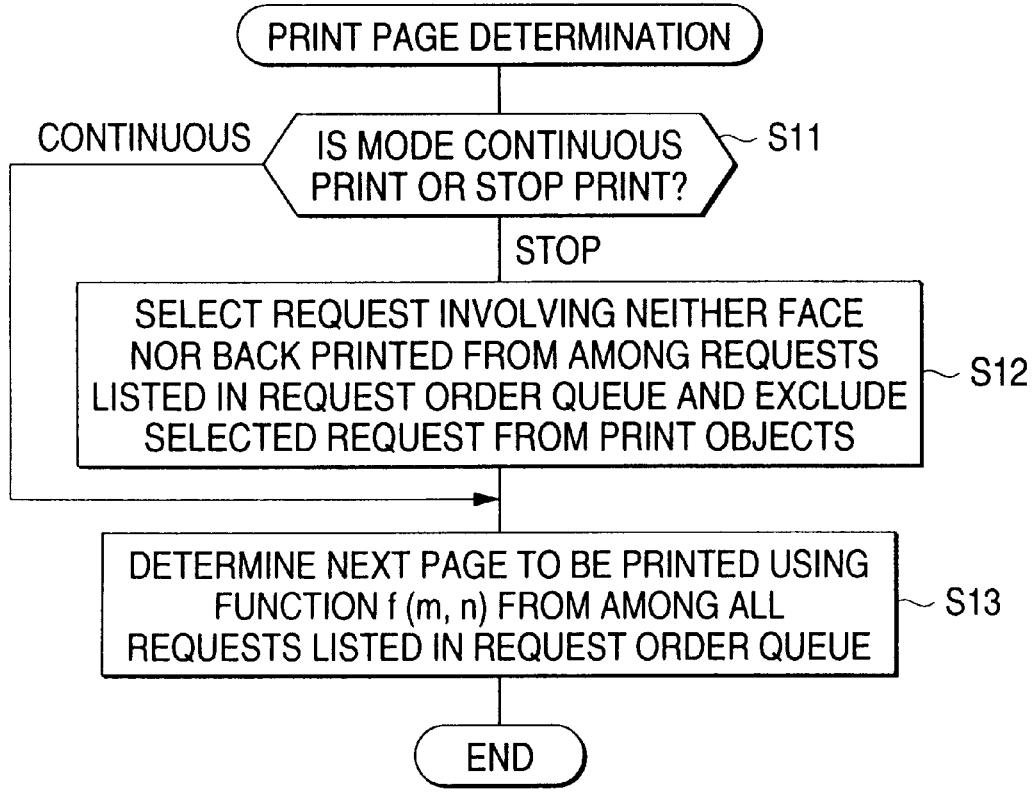
FIG. 7 is a flowchart of the print page determination section 11.

FIG. 7 shows a flow of the print page determination section 11.

First, whether or not the current mode is continuous print or stop print is determined at step S11. If the mode is continuous print, all print requests listed in the request order queue 5 are included in the print objects, the number of print requests of the print objects, n, and the print ordinal number of the next page print, m, (namely, the order counted from the first page print) are counted, and the print request of the next page to be printed is determined according to function f (m, n) based on counted m and n at step S13. If the mode is stop print, a print request not yet involved in actual face or back printing is selected from among the print requests listed in the request order queue 5 and is excluded from the print objects at step S12, then the number of the remaining print requests of the print objects, n, and the print ordinal number of the next page print, m, are counted, and the print request of the next page to be printed is determined using function f (m, n) based on m and n at step S13. At step S12 for excluding the print request from the print objects, specifically the request to be requested is subtracted from the number of print requests, n, already containing the request to be excluded.

The value of the function (m, n) varies depending on the maximum number of sheets of paper that can exist on a paper transport passage. The maximum number of sheets of paper that can exist on the paper transport passage varies from one model of printer to another. If the printers are of the same model, the maximum number of sheets of paper that can exist on the paper transport passage varies depending on the paper size and the paper transport direction. For example, to transport A4-size paper in the short-side direction, three sheets of paper can exist on the paper transport passage, but to transport A3-size paper in the long-side direction, only one sheet of paper can exist on the paper transport passage. In short, the maximum number of sheets of paper entering the paper transport passage varies depending on the length of the paper in the transport direction thereof.

With one printer, if the paper size and the paper transport direction are determined, the length of the paper in the transport direction thereof is determined, thus applied function f (m, n) is determined uniquely. With a printer available with paper of more than one size or a printer that can transport paper in both short-side and long-side directions, the maximum number of sheets of paper entering the paper transport passage can take more than one value. Such a printer has a plurality of functions f (m, n) provided in a one-to-one correspondence with the possible values of the maximum number of sheets of paper entering the paper transport passage. The page determination section 11 shown in FIG. 1 selects one function f (m, n) corresponding to the value of the maximum number of sheets of paper entering the paper transport passage under specific conditions in response to the used paper size and paper transport direction from among the functions f (m, n), and uses the selected function to determine the print order in the double-sided print mode. For example, combinations of available paper sizes and paper transport directions are classified into groups according to the maximum number of sheets of paper entering the paper transport passage and the functions f (m, n) are provided in a one-to-one correspondence with the groups. If a specific combination of the used paper size and paper transport direction is determined, the print page determination section 11 selects the one function f (m, n) corresponding to the group to which the specific combination belongs. If the used paper size and paper transport direction is changed and the maximum number of sheets of paper entering the paper transport passage changes to another value accordingly, the print page determination section 11 newly selects the function f (m, n) corresponding to the new value of the maximum number of sheets of paper and uses the newly selected function to determine the printer order. The page processing section 15 controls the print engine 200 so as to discharge the old-size paper from the paper transport passage, then allows the print requests to be executed in the newly determined print order.

Examples of the function f (m, n) applied when only one sheet of paper can enter the paper transport passage are given below:

(1) f (m, 2)
   f (1, 2)=2
   f (2, 2)=1
(2) f (m, 4)
   f (1, 4)=2
   f (2, 4)=1
   f (3, 4)=4
   f (4, 4)=3
(3) f (m, 6)
   f (1, 6)=2
   f (2, 6)=1
   f (3, 6)=4
   f (4, 6)=3
   f (5, 6)=6
   f (6, 6)=5
(4) f (m, 8)
   f (1, 8)=2
   f (2, 8)=1
   f (3, 8)=4
   f (4, 8)=3
   f (5, 8)=6
   f (6, 8)=5
   f (7, 8)=8
   f (8, 8)=7

Examples applied when n is 10 or more are not given.

Examples of the function f (m, n) applied when a maximum of two sheets of paper enter the paper transport passage are given below:

(1) f (m, 2)
   f (1, 2)=2
   f (2, 2)=1
(2) f (m, 4)
   f (1, 4)=2
   f (2, 4)=4
   f (3, 4)=1
   f (4, 4)=3
(3) f (m, 6)
   f (1, 6)=2
   f (2, 6)=4
   f (3, 6)=1
   f (4, 6)=3
   f (5, 6)=6
   f (6, 6)=5
(4) f (m, 8)
   f (1, 8)=2
   f (2, 8)=4
   f (3, 8)=1
   f (4, 8)=3
   f (5, 8)=6
   f (6, 8)=8
   f (7, 8)=5
   f (8, 8)=7

Examples applied when n is 10 or more are not given.

Examples of the function f (m, n) applied when a maximum of three sheets of paper enter the paper transport passage are given below:

(1) f (m, 2)
   f (1, 2)=2
   f (2, 2)=1
(2) f (m, 4)
   f (1, 4)=2
   f (2, 4)=4
   f (3, 4)=1
   f (4, 4)=3
(3) f (m, 6)
   f (1, 6)=2
   f (2, 6)=4
   f (3, 6)=1
   f (4, 6)=6
   f (5, 6)=3
   f (6, 6)=5
(4) f (m, 8)
   f (1, 8)=2
   f (2, 8)=4
   f (3, 8)=1
   f (4, 8)=6
   f (5, 8)=3
   f (6, 8)=8
   f (7, 8)=5
   f (8, 8)=7

Examples applied when n is 10 or more are not given.

Examples of the function f (m, n) applied when a maximum of four sheets of paper enter the paper transport passage are given below:

(1) f (m, 2)
   f (1, 2)=2
   f (2, 2)=1
(2) f (m, 4)
   f (1, 4)=2
   f (2, 4)=4
   f (3, 4)=1
   f (4, 4)=3
(3) f (m, 6)
   f (1, 6)=2
   f (2, 6)=4
   f (3, 6)=6
   f (4, 6)=1
   f (5, 6)=3
   f (6, 6)=5
(4) f (m, 8)
   f (1, 8)=2
   f (2, 8)=4
   f (3, 8)=6
   f (4, 8)=1
   f (5, 8)=8
   f (6, 8)=3
   f (7, 8)=5
   f (8, 8)=7
(5) f (m, 10)
   f (1, 10)=2
   f (2, 10)=4
   f (3, 10)=6
   f (4, 10)=1
   f (5, 10)=8
   f (6, 10)=3
   f (7, 10)=10
   f (8, 10)=5
   f (9, 10)=7
   f (10, 10)=9
(6) f (m, 12)
   f (1, 12)=2
   f (2, 12)=4
   f (3, 12)=6
   f (4, 12)=1
   f (5, 12)=8
   f (6, 12)=3
   f (7, 12)=10
   f (8, 12)=5 f (9, 12)=12
f (10, 12)=7
f (11, 12)=9
f (12, 12)=11

Examples applied when n is 14 or more are not given.

Examples of the function f (m, n) applied when a maximum of five sheets of paper enter the paper transport passage are given below:

(1) f (m, 2)
   f (1, 2)=2
   f (2, 2)=1
(2) f (m, 4)
   f (1, 4)=2
   f (2, 4)=4
   f (3, 4)=1
   f (4, 4)=3
(3) f (m, 6)
   f (1, 6)=2
   f (2, 6)=4
   f (3, 6)=6
   f (4, 6)=1
   f (5, 6)=3
   f (6, 6)=5
(4) f (m, 8)
   f (1, 8)=2
   f (2, 8)=4
   f (3, 8)=6
   f (4, 8)=8
   f (5, 8)=1
   f (6, 8)=3
   f (7, 8)=5
   f (8, 8)=7
(5) f (m, 10)
   f (1, 10)=2
   f (2, 10)=4
   f (3, 10)=6
   f (4, 10)=8
   f (5, 10)=1
   f (6, 10)=10
   f (7, 10)=3
   f (8, 10)=5
   f (9, 10)=7
   f (10, 10)=9
(6) f (m, 12)
   f (1, 12)=2
   f (2, 12)=4
   f (3, 12)=6
   f (4, 12)=8
   f (5, 12)=1
   f (6, 12)=10
   f (7, 12)=3
   f (8, 12)=12
   f (9, 12)=5
   f (10, 12)=7
   f (11, 12)=9
   f (12, 12)=11
(7) f (m, 14)
   f (1, 14)=2
   f (2, 14)=4
   f (3, 14)=6
   f (4, 14)=8
   f (5, 14)=1
   f (6, 14)=10
   f (7, 14)=3
   f (8, 14)=12
   f (9, 14)=5
   f (10, 14)=14
   f (11, 14)=7
   f (12, 14)=9
   f (13, 14)=11
   f (14, 14)=13

Examples applied when n is 16 or more are not given.

FIGS. 8 to 10 show the above-described flow of the print page determination section 11 using specific examples on the assumption that a maximum of three sheets of paper enter the paper transport passage. In the figures, each box shown under the column "PRINT REQUEST WHICH COMES" means each print request, the digit within each box indicates the page number, the digit below each box indicates the number of copies of each page (number of print copies of each sheet of paper), and a pair of boxes connected by two lines indicates a pair of print requests for printing the face and rear of the same sheet of paper.

At stage 1 shown in FIG. 8, print job data is not yet received. After this, reception of print job data is started. As a result of interpreting the first received data, at stage 2, a pair of print requests indicating double-sided print and the number of copies=one (first page and second page) is prepared in the intermediate buffer 7. At this time, the mode of the print page determination section 11 is "continuous print" (namely, necessary paper exists on the input tray).

At stage 3, the print page determination section 11 determines that the next page to be printed is the "second page," because the number of print requests listed in the request order queue 5, n, is 2 and the print ordinal number (print order) m is 1, resulting in f (1, 2)=2. Thus, at stage 4, the page processing section 15 starts printing the second page. Upon completion of printing the second page, the copy counter 19 decrements the number of copies of the print request of the second page by one, resulting in zero (for easy understanding, the figure shows as if print starting and decrementing the number of copies were executed at the same stage, in fact, however, the number of copies is decremented after completion of the printing, thus is decremented later, for example, after stage 5).

At stage 5, another pair of print requests indicating double-sided print and the number of copies=one (three page and four page) is added. At stage 6, the print page determination section 11 determines that the next page to be printed is the "fourth page," because the number of print requests listed in the request order queue 5, n, is 4 and the print ordinal number (print order) m is 2, resulting in f (2, 4)=4. Thus, at stage 7, the page processing section 15 starts printing the fourth page. Upon completion of printing the fourth page, the number of copies of the print request of the fourth page is decremented by one, resulting in zero.

At stage 8, a subsequent print request does not yet come and m=3 and n=4, thus the next print page is determined the "first page" because f (3, 4)=1. Thus, at stage 9, printing the first page is started and upon completion of the printing, the number of copies of the print request of the first page is decremented by one, resulting in zero.

Printing the first and second pages, namely, double-sided print of the first sheet of paper is now complete. Then, the print request of the first and second pages is discarded from the intermediate buffer 7. Whenever double-sided print of one sheet of paper is thus complete, the print request pair where print is complete is discarded and the number of the discarded print requests, two, is subtracted from m and n accordingly. However, the description given with reference to FIGS. 9 and 10 assumes that double-sided print is not complete for any sheet of paper at the print order determination stage for simplifying the description (however, the number of copies of each request in the figures is represented as 0 in advance of the print completion time at the print start stage of the page).

Next, at stage 10 shown in FIG. 9, still another pair of print requests indicating double-sided print and the number of copies=one (fifth page and sixth page) comes. Then, at stage 11, m=4 and n=6, thus the next print page is determined the "sixth page" because f (4, 6)=6.

If an additional print request does not come after the print requests of the fifth and sixth pages come at stage 10, m=5 and n=6 at stage 13, thus the next print page is determined the "third page" because f (5, 6)=3.

By the way, if the print requests of the fifth and sixth pages does not yet come at stage 10, f (4, 4)=3 at stage 11, thus the next print page is determined the "third page." Thus, the print page order becomes different from that described above. This point is one feature of the embodiment wherein the fixed print order is not used and the print order is determined dynamically from the print requests coming so far, whereby the printer can deal flexibly with such a situation in which job data reception is interrupted during execution of a job, for example, because of trouble of the host or communication.

Next, the description is continued with reference to FIG. 10, which shows a case where paper runs out on the input tray while "continuous print" is being executed.

That is, assume that a new pair of print requests indicating double-sided print and the number of copies=one (fifth page and sixth page) comes at the point to stage 10 from stage 9. Assume that paper runs out on the input tray at stage 11. The mode of the page determination section 11 is changed from "continuous print" to "stop print" accordingly. Then, at stage 12, the print page determination section 11 finds out print requests not yet involved in actual print processing from among the six print requests coming up to now, namely, the print requests of the fifth and sixth pages, and excludes the print requests from the print objects (namely, the number of the requests of the fifth and sixth pages, two, is subtracted from the number of print requests, n=6, resulting in n=4). Thus, n=4 and m=4 and the next print page is determined the "third page" because f (4, 4)=3. At stage 13, printing the third page is started and upon completion of printing the page, the number of copies of the print request of the third page is decremented by one, resulting in zero.

The print order determination of the print requests of the print objects is now complete. Then, the print page determination section 11 sends a message indicating no print requests to the page processing section 15. Upon completion of printing all of the first to fourth pages, the print engine 200 is once stopped. The print requests of the first to fourth pages where print is complete are discarded and the number of the print requests (in this case, four) is subtracted from the number of print requests, n.

After this, if paper is supplied to the input tray, the print page determination section 11 again makes a transition to the "continuous print" mode. In the new continuous print, the first coming print requests are the print requests of the fifth and sixth pages remaining in the previous stop print.

In the operation described with reference to FIGS. 9 and 10, the situation in which double-sided print is not yet complete for any sheets of paper is assumed. For example, if double-sided print of the first and second pages is complete during the operation, the subsequent operation is as follows:

Assuming that, for example, double-sided print of the first and second pages is already complete at stage 10 in FIG. 9 and the print requests of the first and second pages are discarded, the number of the requests of the first and second pages, two, is subtracted from m=4 and n=6, resulting in m=2 and n=4. Thus, the next print page becomes the "fourth page" because f (2, 4)=4. The "fourth page" means the "fourth request" of the requests listed in the request order queue, counted from the top rather than the page number in the document. Now, the requests of the first and second pages are deleted from the request order queue and four requests of the third, fourth, fifth, and sixth pages are listed, thus the "fourth request" specifically indicates the request of the "sixth page." Therefore, the next print page is determined the "sixth page." This is the same as the determination result shown in FIG. 9.

Figure 11A:
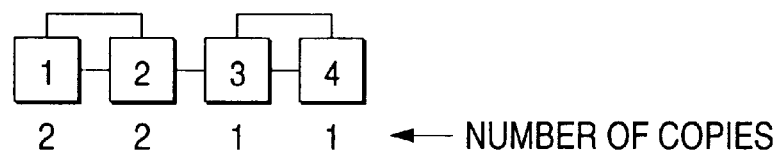
FIGS. 11A to 11C are schematic representations to show a request order queue examples applied when the number of copies is two or more.
Figure 11B:
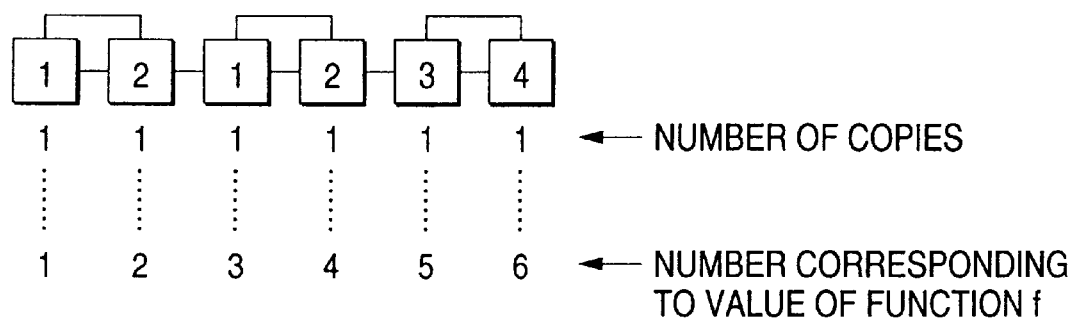

By the way, the above-described example is a case where the number of copies of every print request is one. On the other hand, if a print request indicating that the number of copies is two or more exists, the number of print requests, n, is counted by assuming that the print request appears in the request order queue continuously as many times as the number of copies. That is, as shown in FIG. 11A, for example, if the number of copies of each of the first and second pages is two and that of each of the third and fourth pages is one, it is assumed that the print requests of the first and second pages appear continuously as many times as the number of copies, namely, twice, followed by the print requests of the third and fourth pages. Thus, the number of print requests, n, becomes six. For the six print requests, the print order is determined using the above-described function f (m, n). At the time, the values of f (m, n) correspond to the list order numbers of the print requests as shown at the bottom of FIG. 11B. For example, when f (m, n)=3, the next print page is the first page and when f (m, n)=6, the next print page is the fourth page.

Figure 11C:
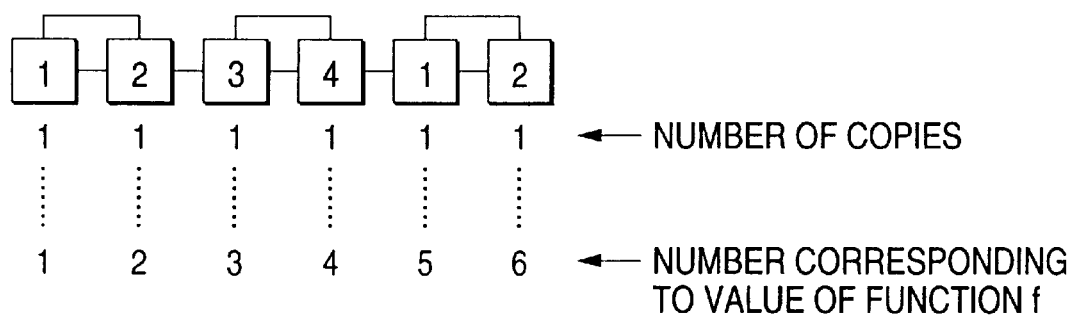

The print request listing method shown in FIG. 11C can also be adopted in place of the listing method shown in FIG. 11B. In FIG. 11C, the print requests of the first to fourth pages are listed in order, followed again by the print requests of the first and second pages.

FIG. 12 shows another request order queue example applied when the number of copies is two or more (for example, three).

Figure 12A:
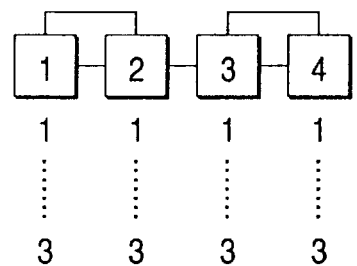
FIGS. 12A to 12C are schematic representations to show other request order queue examples applied when the number of copies is two or more (for example, three)
Figure 12B:
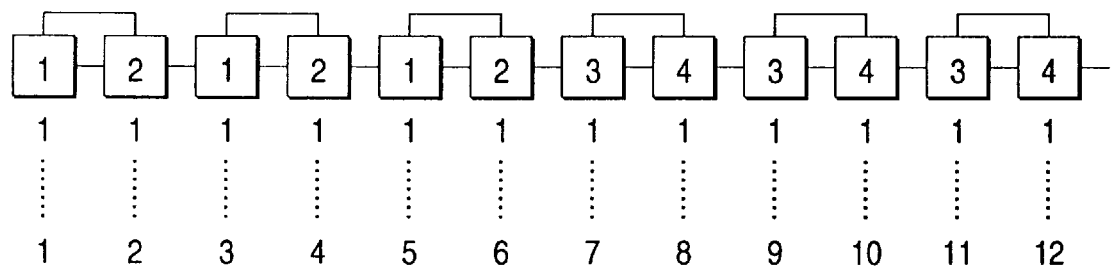
Figure 12C:
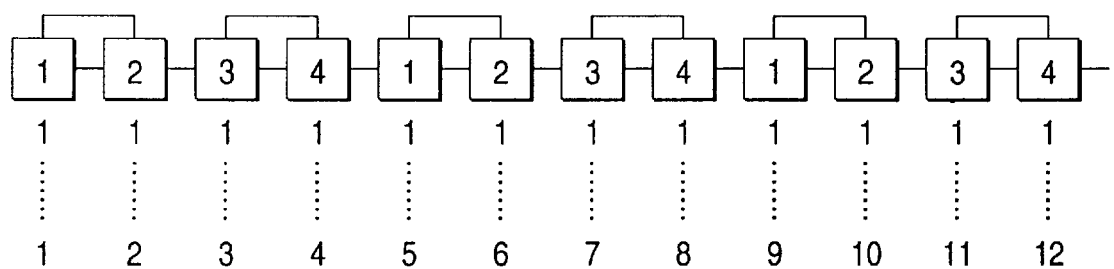

When the number of copies is three and print requests of the first to fourth pages in the double-sided print mode exist in the request order queue as shown in FIG. 12A, the print requests may be expanded as listed as shown in FIG. 12B or 12C. In FIG. 12B, a pair of the first and second pages is listed repeatedly three times and then a pair of the third and fourth pages is listed repeatedly three times, namely, a pair of print requests for printing the same sheet of paper is continuously listed repeatedly as many times as the number of copies. In FIG. 12C, a list of the print requests of the first to fourth pages is followed twice by the same list of the print requests, namely, a list of the print requests of the first to last pages in the queue is placed repeatedly as many times as the number of copies. In a sorter mode for discharging each copy to a different tray, the listing in FIG. 12B is selected and in a collation mode for discharging a number of copies to a single tray in overlapped relation, the listing in FIG. 12C is selected, namely, a listing can be selected in response to the sorter mode or the collation mode.

Figure 13:
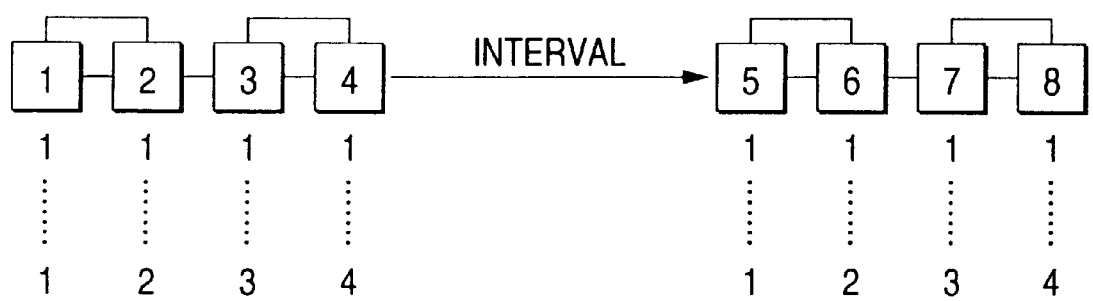
FIG. 13 is a schematic representation to show a request order queue example applied when a long interval is inserted between the preceding and following print requests.

FIG. 13 shows a request order queue example applied when a time interval is inserted between the preceding and following print requests.

As shown in FIG. 13, for example, assume that print requests of the first to fourth pages in the double-sided print mode are entered continuously in the queue and then print requests of the fifth page and later are entered in the queue at a long interval to such an extent that print of the first to fourth pages is complete. In this case, when the print requests of the fifth page and later are entered in the queue, the print requests of the first to fourth pages are erased from the queue. Thus, for the print requests of the fifth page and later, the number of requests, n, and the print ordinal number m are newly counted independently of the print requests of the first to fourth pages, and the print order is determined in accordance with function f (m, n).

Figure 14:
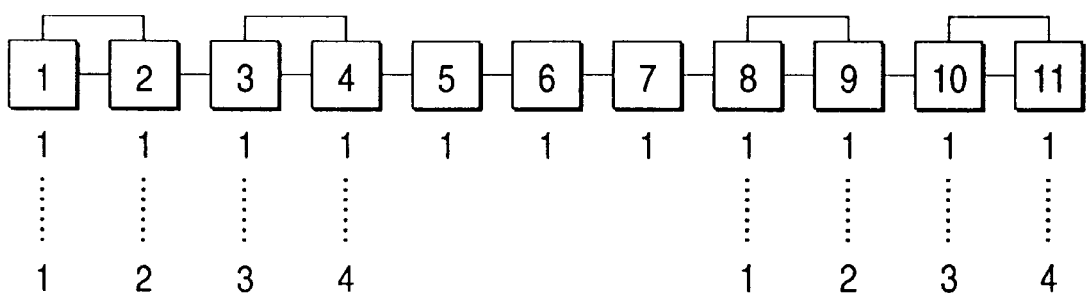
FIG. 14 is a schematic representation to show a request order queue example applied when print requests in the double-sided print mode and the single-sided print mode are mixed in the same print job.

FIG. 14 shows a request order queue example applied when print requests in the double-sided print mode and the single-sided print mode are mixed in the same print job.

As shown in FIG. 14, for example, assume that print requests of the first to fourth pages in the double-sided print mode are followed by print requests of the fifth to seventh pages in the single-sided print mode, followed by print requests of the eighth page and later in the double-sided print mode. In this case, first, the number of requests, n, and the print ordinal number m are counted for the group of the print requests of the first to fourth pages in the double-sided print mode, and the printer order is determined in accordance with function f (m, n). Then, the print requests in the single-sided print mode are executed in the order exactly in the queue. Then, the number of requests, n, and the print ordinal number m are newly counted for the print requests of the eighth page and later in the double-sided print mode, and the printer order is determined in accordance with function f (m, n).

Figure 15A:
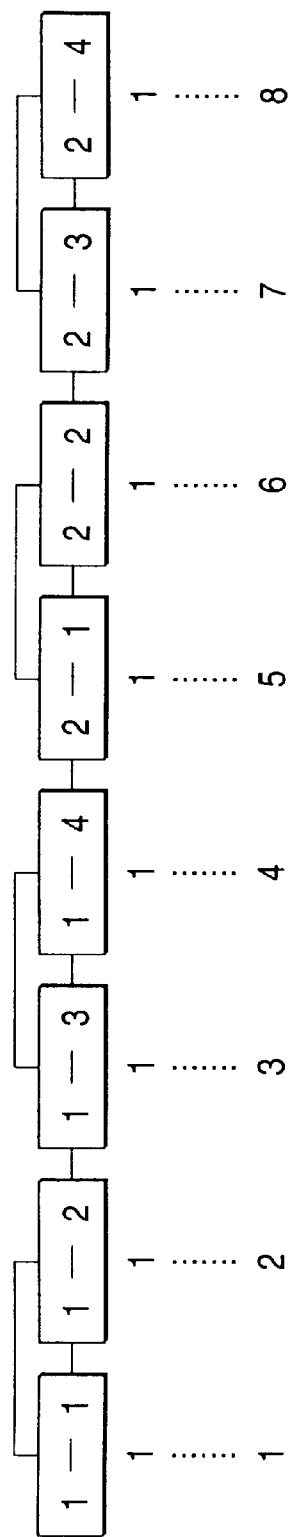
FIGS. 15A and 15B are schematic representations to show how print requests in the request order queue are processed when more than one print job comes consecutively.
Figure 15B:
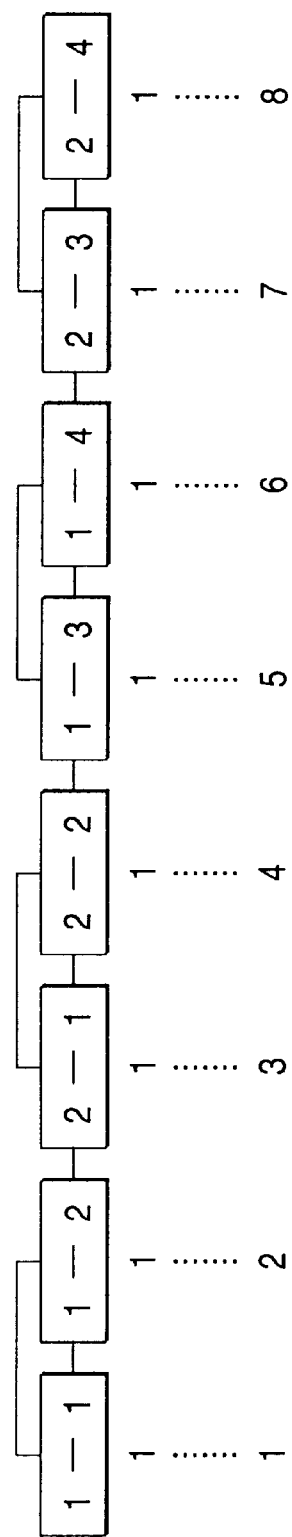

FIGS. 15A and 15B show request order queue examples applied when more than one print job comes consecutively. In FIGS. 15A and 15B, print request symbols, for example, the number "1" preceding the hyphen of "1-2" is the job number and the number "2" following the hyphen is the page number.

As shown in FIG. 15A, for example, assume that the print requests of the second print job are entered consecutively in the queue following the print request of the last fourth page of the first print job. In this case, the number of requests, n, and the print ordinal number m are counted for the print requests of the different print jobs entered consecutively in the request order queue as for the print requests of the same print job, and the printer order is determined in accordance with function f (m, n).

As shown in FIG. 15B, if the print requests of the first print job and those of the second print job are mixed and entered consecutively in the queue, still the number of requests, n, and the print ordinal number m are counted for the print requests as for the print requests of the same print job, and the printer order is determined in accordance with function f (m, n).

Figure 16A:
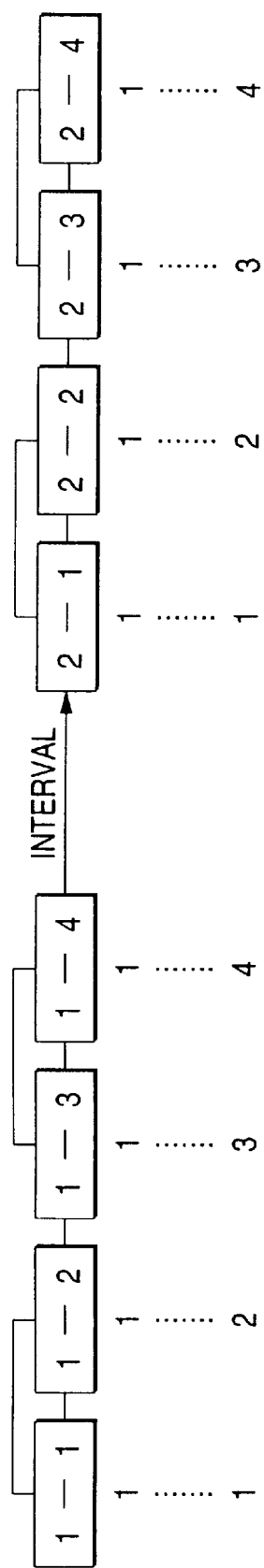
FIG. 16A is a schematic representation to show a request order queue example applied when two or more print jobs come at a long interval therebetween.
Figure 16B:
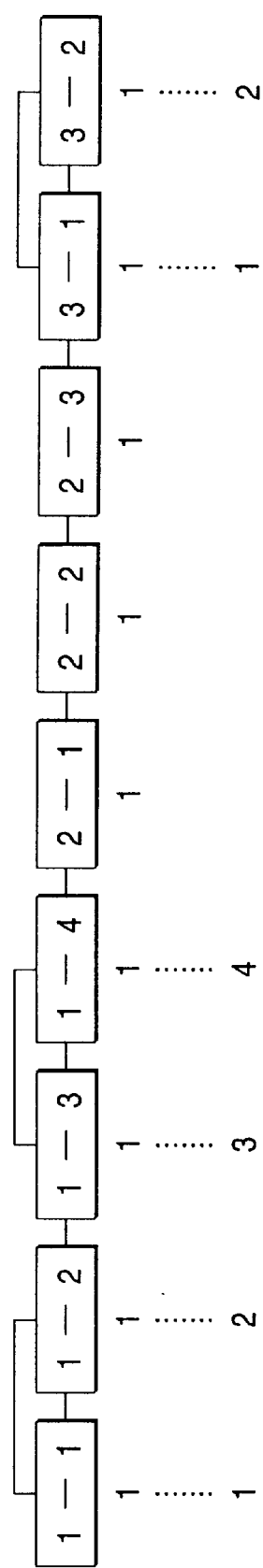
FIG. 16B is a schematic representation to show a request order queue example applied when two or more print jobs come consecutively.

FIGS. 16A and 16B show another request order queue example applied when more than one job comes.

As shown in FIG. 16A, assume that after the print requests of the first print job are entered in the queue, the print requests of the second print job are entered in the queue at an interval between the first and second print jobs to such an extent that all the print requests of the first print job are complete. In this case, determination of the print order in accordance with the function f (m, n) for the print requests of the first print job is executed independently of determination of the print order in accordance with the function f (m, n) for the print requests of the second print job.

As shown in FIG. 16B, assume that after the print requests of the first print job in the double-sided print mode are entered in the queue, the print requests of the second print job in the single-sided print mode are entered consecutively in the queue and then the print requests of the third print job in the double-sided print mode are entered in the queue. In this case, first the printer order is determined in accordance with function f (m, n) for the print requests of the first print job in the double-sided print mode, next the printer order is determined in the order exactly in the queue for the print requests in the second print job. Then, for the print requests of the third print job in the double-sided print mode, the printer order is newly determined in accordance with function f (m, n) independently of the first print job.

Figures 17A, 17B:
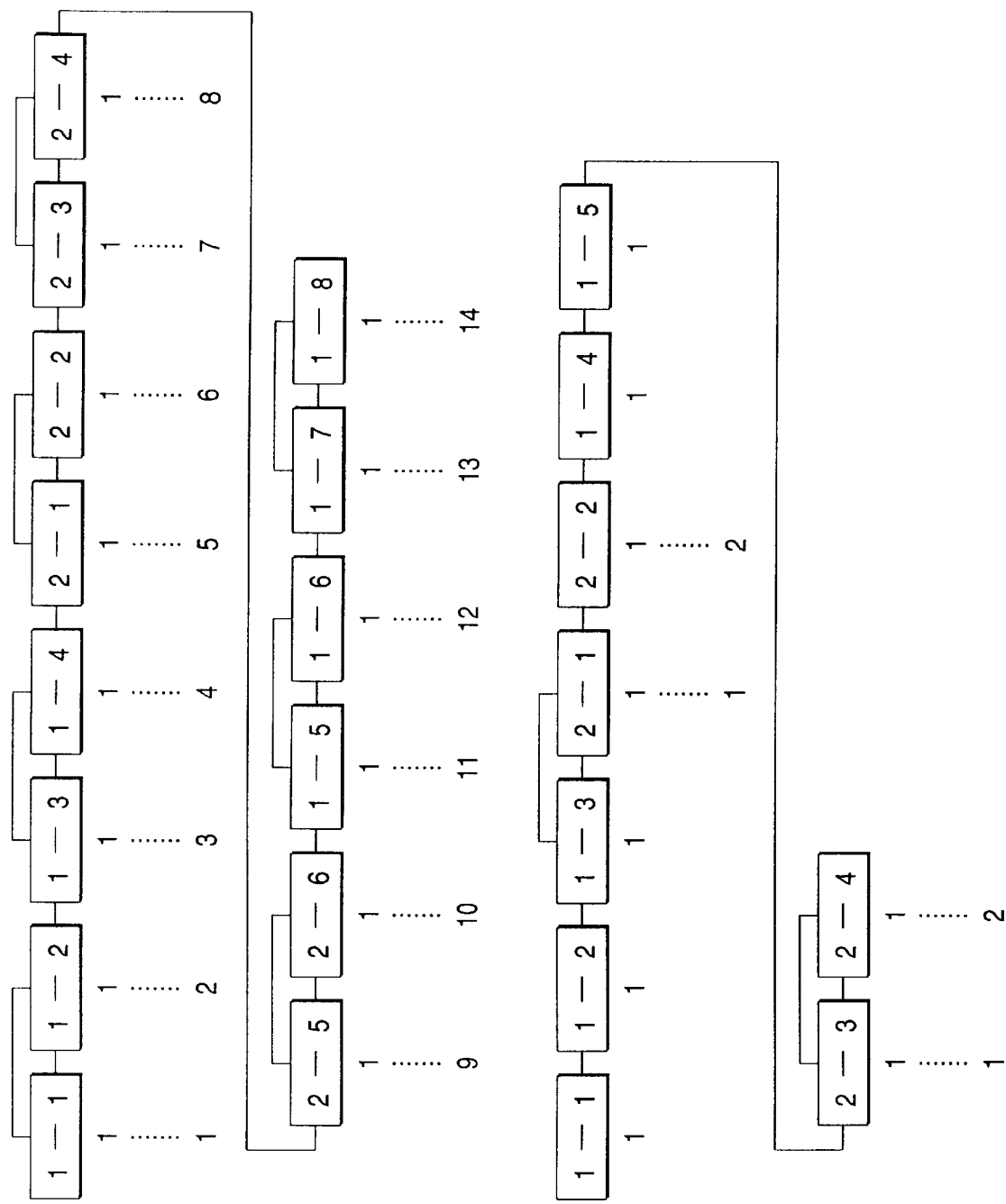
FIGS. 17A and 17B are schematic representations to show request order queue examples applied when another print job interrupts one print job at an intermediate point thereof.

FIGS. 17A and 17B show request order queue examples applied when another print job interrupts one print job at an intermediate point thereof.

As shown in FIG. 17A, for example, assume that the print requests of the first to sixth pages of the second print job in the double-sided print mode interrupt the first print job between the sixth and fifth pages in the listing of the print requests of the first print job in the double-sided print mode. In this case, for the continuous listing of the mixed print requests of the first and second print jobs, the number of requests, n, and the print ordinal number m are counted as for the print requests of the single print job, and the printer order is determined in accordance with function f (m, n).

As shown in FIG. 17B, for example, assume that the print requests of the first and second pages of the second print job in the double-sided print mode interrupt the first print job between the third and fourth pages in the listing of the print requests of the first print job in the single-sided print mode. In this case, first, the print requests of the first to third pages of the first print job in the single-sided print mode are executed in the order exactly in the queue. Subsequently, the print requests of the second print job in the double-sided print mode are executed in the order determined in accordance with function f (m, n), then the print requests of the fourth page and later of the first print job in the single-sided print mode are executed in the order exactly in the queue.

As described with reference to FIGS. 13 to 17, for the print requests in the double-sided print mode continuously listed in the request order queue, the number of requests, n, and the print ordinal number m are counted by the same method, and the printer order is determined in accordance with function f (m, n) regardless of whether the print requests are contained in the same or different print job.

Thus, in the embodiment, each time an attempt is made to perform processing of the next page, dynamically the page is determined, so that the print order determined to be at the highest speed is found from the job data received so far at the printer, and print can be executed in the print order. The next page to be printed can be determined with a delay to the deadline where the next page to be printed must be determined so as not to interrupt the print operation of the print engine, whereby the job data as late as possible can also be considered for determining the print order at the highest speed. The principle of the invention is also applicable to collation print of a number of copies, interrupt print of a different print job, parallel processing of a number of jobs, etc.

While the preferred embodiment of the invention has been described, such description is for illustrative purposes only, and it is to be understood that the invention is not limited to the embodiment thereof. Therefore, many apparently widely different embodiments of the invention may be made without departing from the spirit and scope thereof.

What is claimed is:

1. A printer having a double-sided print function, said printer comprising:

a print engine for printing a page image on both sides of a paper;

a print request preparation section for preparing a print request in page units from received print job data;

a queue comprising the prepared print requests listed in one order;

a print page determination section for counting number of print requests included in print objects among the print requests in a double-sided print mode existing in said queue, counting a print ordinal number of the next page print, and applying a unified rule to the counted number of print requests and the counted print ordinal number each time an attempt is made to start the next page print, thereby determining the print request corresponding to the next page print from among the print requests included in the print objects; and a page processing section for controlling said print engine so as to execute the print request determined by said print page determination section.

2. A printer according to claim 1, wherein the print request contains specification of number of copies, said printer further comprising a copy counter, whenever a page is printed, for decrementing the remaining number of copies for the print request of the printed page by one, and wherein, when the remaining number of copies becomes zero for all print requests included in the print objects, said print page determination section determines that the next page to be printed does not exist.

3. A printer according to claim 1, wherein said print page determination section includes all print requests existing in said queue in the print objects and counts the number of print requests when new paper can be supplied, and includes remaining print requests except a print request not yet involved in actual print among the print requests listed so far in said queue in the print objects and counts the number of print requests when new paper cannot be supplied.

4. A printer according to claim 1, wherein said page processing section has an image buffer of a size smaller than a one-page image and uses the image buffer to expand a partial image of the next page to be printed, then transfers the image to said print engine.

5. A printer according to claim 1, wherein said print engine has an input tray for supplying a new paper, a turnaround module for turning around a paper with only single side already printed, and an output tray to which a paper with both sides already printed is discharged, and wherein said page processing section selects a paper source from between said input tray and said turnaround module and determines a discharge destination from between said output tray and said turnaround module based on face/back specification contained in the print request determined by said print page determination section.

6. A printer according to claim 1, wherein the print request of each page is linked with image data of the object existing on the page, and wherein if the same object exists on two or more pages, the print requests of the two or more pages are linked with the image data of the same object.

7. A printer according to claim 1, wherein said print page determination section applies the same unified rule to a plurality of print requests included in the print objects among the print requests in the double-sided print mode existing in said queue regardless of whether the print requests included in the print objects belong to the same or different print job, thereby determining the print request of the next page to be printed from among the print requests included in the print objects.

8. A printer according to claim 1, wherein if print requests in the double-sided print mode and a single-sided print mode are mixed in said queue, said print page determination section classifies a plurality of print requests included in the print objects among the print requests in the double-sided print mode existing in said queue into groups of continuously listed print requests in said queue and applies the unified rule to each group, thereby determining the print request of the next page to be printed from among the print requests included in the print objects.

9. A printer according to claim 1 wherein if a print request in the double-sided print mode specifying number of copies as two or more exists in said queue, when said print page determination section applies the unified rule, it assumes that the print request in the double-sided print mode specifying the number of copies as two or more occurs in said queue as many times as the number of copies.

10. A double-sided print controller for controlling double-sided print operation of a print engine which prints a page image on both sides of paper, said double-sided print controller comprising:

a print request preparation section for preparing a print request in page units from received print job data;

a queue comprising the prepared print requests listed in one order;

a print page determination section, when at least double-sided print is executed, for counting number of print requests included in print objects among said print requests existing in said queue, counting a print ordinal number of the next page print, and applying a unified rule to the counted number of print requests and the counted print ordinal number each time an attempt is made to start the next page print, thereby determining the print request corresponding to the next page print from among the print requests included in the print objects; and a page processing section for controlling the print engine so as to execute the print request determined by said print page determination section.

11. A print order controller for controlling a print order in a double-sided print mode of a printer, said printer order controller comprising:

a print request preparation section for preparing a print request in page units containing specification of number of copies and face/back specification from received print job data;

a queue comprising the prepared print requests listed in one order; and a print page determination section, when at least double-sided print is executed, for counting number of print requests included in print objects among the print requests existing in said queue, counting a print ordinal number of the next page print, and applying a unified rule to the counted number of print requests and the counted print ordinal number each time an attempt is made to start the next page print, thereby determining the print request corresponding to the next page print from among the print requests included in the print objects.

12. A print order control method for controlling a print order in a double-sided print mode of a printer, said method comprising steps of:

preparing a print request in page units from received print job data;

listing the prepared print requests in one order;

when at least double-sided print is executed, counting number of print requests included in print objects among current listed print requests;

counting a print ordinal number of the next page print; and applying a unified rule to the counted number of print requests and the counted print ordinal number each time an attempt is made to start the next page print, thereby determining the print request corresponding to the next page print from among the print requests included in the print objects.

13. A computer-readable record medium holding a program for causing a computer to execute a print order control method for controlling a print order in a double-sided print mode of a printer, said method comprising steps of:

preparing a print request in page units from received print job data;

listing the prepared print requests in one order; and when at least double-sided print is executed, counting number of print requests included in print objects among current listed print requests;

counting a print ordinal number of the next page print, and applying a unified rule to the counted number of print requests and the counted print ordinal number each time an attempt is made to start the next page print, thereby determining the print request corresponding to the next page print from among the print requests included in the print objects.

14. A printer having a double-sided print function, said printer comprising:

a print engine for printing a page image on both sides of paper, said print engine having an image formation mechanism and a paper transport mechanism for feeding the paper into the image formation mechanism, wherein maximum number of sheets of paper entering the paper transport mechanism varies depending on a length of the paper in a transport direction thereof, a plurality of rules for determining a print order in a double-sided print mode, corresponding to a plurality of values that the maximum number of sheets of paper can take;

a print request preparation section for preparing a print request in page units from received print job data;

a queue comprising the prepared print requests listed in one order;

a print order determination section for selecting one rule fitted to a specific used paper length from among said plurality of rules and uses the selected rule to determine the print order for the print requests included in print objects among the print requests in the double-sided print mode existing in said queue; and a page processing section for controlling said print engine so as to execute the print requests existing in said queue in the print order determined by said print order determination section.

15. A printer according to claim 14, wherein when the specific used paper length is changed, said print order determination section newly selects one rule fitted to the post-changed specific used paper length from among said plurality of rules and uses the newly selected rule to determine the print order for the print requests included in print objects among the print requests in the double-sided print mode existing in said queue, and wherein said page processing section controls said print engine so as to discharge paper of the pre-changed length already entering the paper transport mechanism from the paper transport mechanism and then execute the print requests existing in said queue in the print order determined by said print order determination section.

16. A printer according to claim 14, wherein available paper sizes are grouped according to the maximum sheets of paper entering the paper transport mechanism and any one of said plurality of rules is previously related to each group, and wherein said print order determination section selects one rule related to a group to which the specific used paper length belongs.

17. A double-sided print controller for controlling double-sided print operation of a print engine for printing a page image on both sides of paper, the print engine having an image formation mechanism and a paper transport mechanism for feeding the paper into the image formation mechanism, wherein maximum number of sheets of paper entering the paper transport mechanism varies depending on a length of the paper in a transport direction thereof, said double-sided print controller comprising:

a plurality of rules for determining a print order in a double-sided print mode, corresponding to a plurality of values that the maximum number of sheets of paper can take;

a print request preparation section for preparing a print request in page units from received print job data;

a queue comprising the prepared print requests listed in one order;

a print order determination section for selecting one rule fitted to a specific used paper length from among said plurality of rules and uses the selected rule to determine the print order for the print requests included in print objects among the print requests in the double-sided print mode existing in said queue; and a page processing section for controlling the print engine so as to execute the print requests existing in said queue in the print order determined by said print order determination section.

18. A print order controller for controlling a print order in a double-sided print mode in a printer comprising an image formation mechanism and a paper transport mechanism for feeding a paper into the image formation mechanism, wherein maximum number of sheets of paper entering the paper transport mechanism varies depending on a length of the paper in a transport direction thereof, said print order controller comprising:

a plurality of rules for determining a print order in a double-sided print mode, corresponding to a plurality of values that the maximum number of sheets of paper can take;

a print request preparation section for preparing a print request in page units from received print job data;

a queue comprising the prepared print requests listed in one order; and a print order determination section for selecting one rule fitted to a specific used paper length from among said plurality of rules and uses the selected rule to determine the print order for the print requests included in print objects among the print requests in the double-sided print mode existing in said queue.

19. A print order control method for controlling a print order in a double-sided print mode in a printer having an image formation mechanism and a paper transport mechanism for feeding a paper into the image formation mechanism, wherein maximum number of sheets of the paper entering the paper transport mechanism varies depending on a length of the paper in a transport direction thereof, said method comprising steps of:

selecting one rule fitted to a specific used paper length from among a plurality of rules for determining a print order in the double-sided print mode, corresponding to a plurality of values that the maximum number of sheets of the paper entering the paper transport mechanism can take;

preparing a print request in page units from received print job data;

listing the prepared print requests in one order; and when at least double-sided print is executed, using the selected rule to determine the print order for the print requests included in print objects among current print requests listed in the queue.

20. A computer-readable record medium holding a program for causing a computer to execute a print order control method for controlling a print order in a double-sided print mode in a printer having an image formation mechanism and a paper transport mechanism for feeding paper into the image formation mechanism, wherein maximum number of sheets of paper entering the paper transport mechanism varies depending on a length of the paper in a transport direction thereof, said method comprising steps of:

selecting one rule fitted to a specific used paper length from among a plurality of rules for determining a print order in the double-sided print mode, corresponding to a plurality of values that the maximum number of sheets of the paper entering the paper transport mechanism can take;

preparing a print request in page units from received print job data;

listing the prepared print requests in one order; and when at least double-sided print is executed, using the selected rule to determine the print order for the print requests included in print objects among current print requests listed in the queue.

* * * * *